US007472001B2

(12) United States Patent
Grace et al.

(10) Patent No.: US 7,472,001 B2
(45) Date of Patent: Dec. 30, 2008

(54) EMBEDDED HARD DRIVE INFOTAINMENT SYSTEM

(75) Inventors: James R. Grace, Royal Oak, MI (US); Robert M. Riley, Jr., Albuquerque, NM (US); James M. Kortge, Ferndale, MI (US); Scott A. Rush, Plymouth, MI (US); Axel Nix, Birmingham, MI (US); Andrew W. Gellatly, Macomb, MI (US); Brian V. Sychta, Lake Orion, MI (US); Michael S. Schwartz, Molnlycke (SE)

(73) Assignee: GM Global Technology Operations, Inc., Detroit, MI (US)

( * ) Notice: Subject to any disclaimer, the term of this patent is extended or adjusted under 35 U.S.C. 154(b) by 667 days.

(21) Appl. No.: 11/172,619

(22) Filed: Jun. 30, 2005

(65) Prior Publication Data

US 2006/0004948 A1 Jan. 5, 2006

Related U.S. Application Data

(63) Continuation of application No. 11/036,213, filed on Jan. 14, 2005.

(60) Provisional application No. 60/538,043, filed on Jan. 21, 2004.

(51) Int. Cl.
*G06F 7/10* (2006.01)
(52) U.S. Cl. .................................. 701/36; 707/1
(58) Field of Classification Search ................ 701/1, 701/36; 707/1–206
See application file for complete search history.

(56) References Cited

U.S. PATENT DOCUMENTS

| 6,470,358 B1 * | 10/2002 | Beyda et al. ............... 707/201 |
| 7,398,524 B2 * | 7/2008 | Shapiro ...................... 717/175 |
| 2006/0194549 A1 * | 8/2006 | Janik et al. .................. 455/73 |

* cited by examiner

*Primary Examiner*—Richard M. Camby

(57) ABSTRACT

Apparatus is provided for an electronic vehicle storage system. The apparatus includes a vehicle electrical infrastructure, a vehicle communications network coupled to the vehicle electrical infrastructure, a controller coupled to the vehicle electrical infrastructure via the vehicle communications network, and a data storage device coupled to the controller and configured to store multimedia files. The controller is configured to communicate with the vehicle electrical infrastructure. The data storage device includes an embedded database containing a list of multimedia file content. The controller is further configured to access the embedded database and associate a recognized multimedia file with a multimedia file content from the list of multimedia file content.

20 Claims, 2 Drawing Sheets

EMBEDDED HARD DRIVE INFOTAINMENT SYSTEM

CROSS-REFERENCE TO RELATED APPLICATION

This application is a continuation of U.S. Ser. No. 11/036,213 filed Jan. 14, 2005, which claims the benefit of U.S. Provisional Ser. No. 60/538,043, filed Jan. 21, 2004.

TECHNICAL FIELD

The present invention generally relates to transfer and storage of multimedia information in a motor vehicle, and more particularly relates to the use of a hard disk drive and applications of a hard disk drive in a motor vehicle.

BACKGROUND

Vehicle operators tend to spend a significant amount of time in their respective vehicles particularly when commuting from a home to a workplace, running errands, conducting business, vacationing, or for many other reasons. This time is significant enough that some vehicles come equipped with a variety of consumer electronics such as compact disc (CD) players, cassette tape players, radios, satellite radios, electronic gaming, and digital video disc (DVD) players. Some owners may also choose to equip their vehicle with aftermarket consumer electronics in the event their vehicles lack such consumer electronics or for purposes of customization. These and other entertainment or infotainment electronic devices provide a passenger in the vehicle with time-occupying options and may improve the passenger's quality of time.

Consumer electronics such as CD players, cassette tape players, DVD players, and electronic gaming generally have related media content for playback residing on a localized storage medium. For example, many on-board navigation systems utilize geographic information stored on CDs. This information may be downloaded to a memory specifically associated with the navigation system, located in the vehicle, or directly accessed from the CD by the navigation system. In another example, CD players commonly play media that is stored on CD. Most of these playback devices can accept one or a limited number of storage media during operation and thereby generally have a relatively limited capacity of media selection. For example, a CD player with a six-disc CD changer has a selection of music tracks that are limited to any six CDs contained in the CD changer.

With multimedia that is stored on various mediums, such as CD or DVD, the preservation of digital rights management (DRM) has become prominent. In more recent times, preservation of DRM is of particular concern for digital multimedia. For example, many performances that are recorded onto CDs are copyright protected. Additionally, access to such recordings may be limited to certain types of playback devices in an attempt to prevent unauthorized duplication of the recordings. For example, some CDs may be limited to playback on a conventional stand-alone CD player having a read-only operation but not on a CD drive found to accompany personal computers where unauthorized duplication may occur.

Accordingly, it is desirable to provide a multimedia data storage system for a vehicle that stores a variety of multimedia files therein while preserving DRM. In addition, it is desirable to provide a hard disk drive for a vehicle having embedded content corresponding to downloadable multimedia files that may be synchronized with a remote data storage device. Furthermore, it is desirable to provide a electronic vehicle storage system that stores status and diagnostic information regarding a variety of vehicle electrical systems and subsystems for future retrieval. Finally, other desirable features and characteristics of the present invention will become apparent from the subsequent detailed description and the appended claims, taken in conjunction with the accompanying drawings and the foregoing technical field and background.

BRIEF SUMMARY

An apparatus is provided for an embedded hard drive infotainment system. In one exemplary embodiment, an electronic vehicle storage system is provided having a vehicle electrical infrastructure, a vehicle communications network coupled to the vehicle electrical infrastructure, a controller coupled to the vehicle electrical infrastructure via the vehicle communications network, and a data storage device coupled to the controller and configured to store multimedia files. The controller is configured to communicate with the vehicle electrical infrastructure. The data storage device includes an embedded database containing a list of multimedia file content. The controller is further configured to access the embedded database and associate a recognized multimedia file with a multimedia file content from the list of multimedia file content.

In another exemplary embodiment, an infotainment system for a motor vehicle is provided. The infotainment system includes at least one vehicle electrical subsystem, a controller coupled to the at least one vehicle electrical subsystem, a hard drive coupled to the controller, and a playback device coupled to the controller. The hard drive is configured to store multimedia files and includes an embedded database containing a plurality of content lists. The playback device is configured to playback multimedia files stored on a portable storage medium. The controller is further configured to access the embedded database, associate the multimedia files stored on the portable storage medium with a content list from the plurality of content lists, and transfer at least a portion of the multimedia file associated with the portable storage medium to the hard drive.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
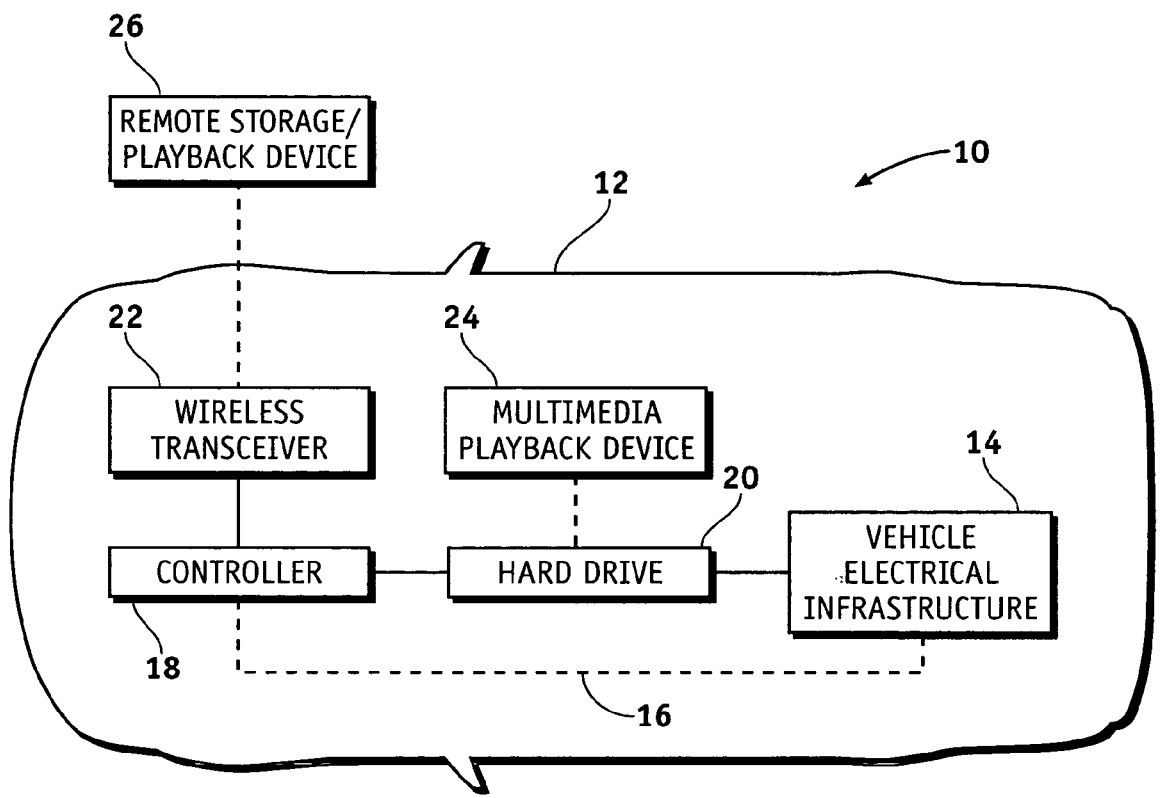
FIG. 1 is a schematic diagram illustrating a first exemplary embodiment of an electronic vehicle storage system in a vehicle.

Referring to the drawings, FIG. 1 is a schematic diagram illustrating a first exemplary embodiment of an electronic vehicle storage system 10 in a vehicle 12. In a more basic exemplary embodiment, the electronic vehicle storage system 10 includes a vehicle electrical infrastructure 14, a vehicle communications network 16 coupled to the vehicle electrical infrastructure 14, a controller 18 coupled to the vehicle electrical infrastructure 14, such as via the vehicle communications network 16, and a data storage device 20 coupled to the controller 18 and configured to store multimedia files. The data storage device 20 and controller 18 are integrated in the vehicle 12. The controller 18 communicates with the vehicle electrical infrastructure 14, such as to receive current status information regarding various vehicle electrical systems/subsystems, as described in greater detail hereinafter. The data storage device 20 includes an embedded database containing a list of content that may be accessed by the controller 18 to associate a recognized multimedia file with a corresponding content from the list of content. A variety of multimedia storage/playback devices may be directly coupled to the electronic vehicle storage system 10, such as a multimedia playback 24 device located in the vehicle 12 (e.g., in-dash radio receiver and CD player) or a portable storage/playback device (e.g., MP3 player) via a universal serial bus (USB) connection, firewire, or other conventional one-way or two-way communication line. Additionally, a remote storage/playback device 26 may be wirelessly coupled with the electronic vehicle storage system 10, as described in greater detail hereinafter. The electronic vehicle storage system 10 provides a user with access to generally more audio or other multimedia content than found in conventional CD players.

As used herein, the term "file" refers to any data that is stored at one or more sources and is to be delivered as a unit to one or more destinations. For example, a document, an image, and a file from a file server or computer storage device, are all examples of "files" that may be delivered. Files can be of known size (such as a one megabyte image stored on a hard disk) or can be of unknown size (such as a file taken from the output of a streaming source).

The vehicle electrical infrastructure 14 may include various systems and/or subsystems on the vehicle 12, including by way of example and not of limitation a human vehicle interface, a battery power management system, an engine management system, a transmission management system, a body control module, and vehicle subsystems such as an antilock brake system (ABS). The data storage device 20 and controller 18 communicate over the vehicle communications network, such as GMLAN, CAN, and J1850 type communication protocols, to transfer information to and from the vehicle systems and subsystems.

In one exemplary embodiment, the data storage device 20 is a hard disk drive, or hard drive, that has at least one platter/disk (not shown) accessed by a read/write head(s) (not shown) to transfer data from/to the platter/disk. The hard drive 20 may store a variety of data including, but not limited to, multimedia files, such as audio files, and a variety of status and diagnostic information from the various systems and subsystems of the vehicle 12, such as ABS status information. The hard drive 20 is located in the vehicle 12 and is wired to the vehicle electrical infrastructure 14. Although the data storage device 20 is described herein in the context of a hard drive, a variety of other types of mass storage devices may also be used that have read/write operations.

As previously mentioned, the controller 18, such as a microprocessor or other conventional processing device, is coupled to the hard drive 20 to access information on the hard drive 20, directs transfer of information to/from the hard drive 20, and optionally communicates with various systems and/or subsystems on the vehicle 12. Although the controller 18 is shown as a separate device from the hard drive 20, the combined configuration of the controller 18 and hard drive 20 is not critical to the electronic vehicle storage system 10. For example, in another exemplary embodiment, the hard drive 20 incorporates the controller 18.

The hard drive 20 may optionally communicate over a wireless network including, but not limited to, Wi-Fi, bluetooth, or a cellular network to transfer information to and from remote systems, such as a key fob and a personal computer. In this embodiment, a wireless transceiver 22 is coupled to the controller 18. For example, the hard drive 20 communicates with a telematics provider, such as OnStar, to transfer information from a remote system using a cellular/satellite network and the Internet or other similar computer network. In another exemplary embodiment of the present invention, a radio transceiver is electronically coupled to the hard drive to communicate over the previously mentioned wireless networks. The particular wireless network or transceiver is not critical to the operation of the electronic vehicle storage system 10 provided each is compatible with the other. Those of skill in the art will appreciate that a variety of different conventional wireless receivers, transmitters, and transceivers may be used to transfer information between the hard drive 20 and a remotely located (i.e., external to the vehicle) multimedia storage system/device.

Each multimedia file has a corresponding a multimedia file content. More than one multimedia file may be stored in a portable storage medium, stored in the hard drive 20, transferred to/from the wireless transceiver 22, or otherwise processed by the various components of the electronic vehicle storage system 10. Examples of conventional portable storage medium include, by way of example and not limitation, CD, digital video disc (DVD), read-only memory (ROM), programmable ROM types, random access memory (RAM), floppy disk, magnetic tape, flash memory, hard disk, etc.

In one exemplary embodiment, content from a CD, such as an in-dash CD player coupled to the data storage device 20 or a CD drive integrated with the data storage device, may be transferred to the data storage device 20. For example, the user may insert a normal audio CD and copy content from the CD on to the data storage device 20. The controller 18 recognizes the content of the CD using the embedded database to associate the CD with a list of the content on the CD. If a CD is inserted into the system 10 that is not recognized by the controller 18, a telematics connection is established by the controller 18 via the wireless transceiver 22 to a remote storage/playback device 26, such as a remote server. Information regarding the inserted CD, such as genre, artist, album, may be retrieved from a database on the server by the controller 18, downloaded to the hard drive 20, and stored with the embedded database. The embedded database may also be updated by receiving broadcast updates through the wireless transceiver and downloaded the updates to the hard drive 20. Content from a variety of other storage mediums may also be transferred to the hard drive 20, such as from a DVD player or an MP3 player.

Figure 2:
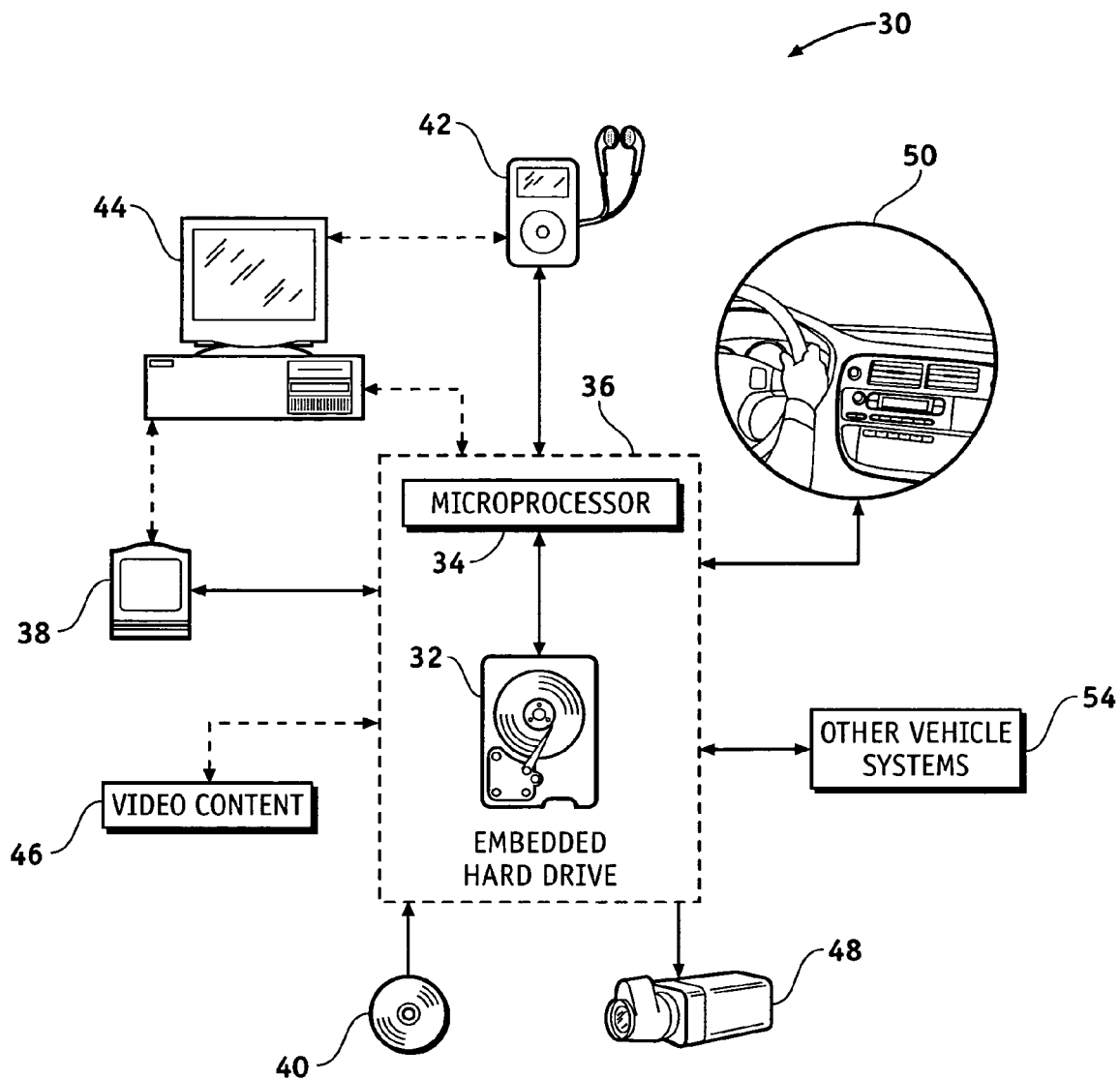
FIG. 2 is a block diagram of a second exemplary embodiment of electronic vehicle storage system.

FIG. 2 is a block diagram illustrating communication between components of an electronic vehicle storage system 30. In this embodiment, a hard drive 32, such as the hard drive 20 shown in FIG. 1, has an embedded database containing a list of multimedia file content. A controller 34, such as the controller 18 shown in FIG. 1, is a microprocessor that is coupled to the hard drive 32. Routing of communication from various components of the electronic vehicle storage system 30 to the data storage device 36 may vary between the hard drive 32 and the microprocessor 34. For simplicity of explanation in this exemplary embodiment, the hard drive 32 and the microprocessor 34 are together referred to as a data storage device 36. For example, control signals may be communicated between the microprocessor 34 and the wireless transceiver 22 shown in FIG. 1, and multimedia files may be wirelessly transferred from a personal computer 44 (PC) to the hard drive 32. In this example, such control signal communication and multimedia file transfer together establish communication between the data storage device 36 and the personal computer 44. The particular routing of communication among the hard drive 32, the microprocessor 34, and other components of the electronic vehicle storage system 30 is not critical to the operation of the same.

The hard drive 32 stores multimedia files such as found on conventional CDs, DVDs, and other storage mediums. Multimedia files may be downloaded to the data storage device 36 from any number of devices. As best shown in FIG. 2, multimedia files may be downloaded to the data storage device 36 from a conventional CD 40, a compressed audio CD 38 such as may be used to store MP3 files or the like, a portable storage/player device 42 such as a DVD player, a video content storage/player device 46 such as a digital video recorder (DVR), and a personal computer 44. In one exemplary embodiment, the multimedia files are stored as compressed files on the hard drive 32.

To preserve DRM protected multimedia files, a public key encoding system may be used to encrypt such multimedia files. For example, a vehicle identification number (VIN) may be used as the public key. In a wireless transfer configuration, the vehicle's public key may be transmitted over the wireless network to the remotely connected personal computer 44, portable storage/player device 42, or video content storage/player device 46 to be used for encrypting content. For an end-to-end DRM scheme, the vehicle, such as the vehicle 12 shown in FIG. 1, may authenticate using the VIN as the public key before transfer of content thereto while also preserving DRM protected content from subsequent transfer out of the vehicle 12.

Wireless transfer of multimedia files may be accomplished using a wireless transceiver such as the wireless transceiver 22 shown in FIG. 1. In one exemplary embodiment, content may be transferred between the electronic vehicle storage system 30 in the vehicle 12 (FIG. 1) and a remote storage/playback device 26 (FIG. 1) such as the home PC 44. For example, one or more audio file in a music collection stored on the data storage device 36 may be transferred to the home PC 44 via the wireless transceiver 22. In this exemplary embodiment, content that may have been "ripped" from purchased CDs onto the hard drive 32 may be transferred to the PC 44.

In one exemplary embodiment, the data storage device 36 may be coupled to one or more of a user interface 50, a video system 48, and other vehicle systems 54 such as previously mentioned with respect to the vehicle 12 shown in FIG. 1. Being coupled with other vehicle systems 54, the data storage device 36 may record diagnostic and status information to the hard drive 32 to record states as time passes. This embodiment is particularly useful as an automotive "black box" where the data storage device 36 may be recovered in the event of a crash of the vehicle 12 (FIG. 1) occurs. The status information of various vehicle systems 54 stored in the data storage device 36 may be used to determine information about the crash. Additionally, the data storage device 36 may record diagnostic information relevant to the vehicle history and service to the hard drive 32. This information may be used by service professionals when repairing or performing maintenance on the vehicle 12 (FIG. 1).

The user interface 50 displays the contents of the multimedia files stored on the hard drive 32, such as a music library, in the vehicle 12 (FIG. 1) and provides navigation, such as music navigation using a rotating knob or push button, among the multimedia files. In one exemplary embodiment, the data storage device 36 monitors and determines listening habits of the user, such as by associating an audio file with a corresponding content. Based on the determined listening habits, the microprocessor 34 may generate a playlist so that browsing by the user to a particular content is not necessary. In one example, a "one-touch" scheme may be used to automatically generate the playlist. The entire contents of the music library may be displayed such as on a display bar. For example, a current position within the music library may be marked using an indicator, such as a pointer, along the display bar. The user can move through the music library by rotating a knob counter clockwise and clockwise. The music library may be marked along the display bar by genres, artists, albums, etc. A softkey may also be used to "jump" to a specific place along the display bar. Although the user interface 50 is described herein with regard to the music library, a general multimedia library may also be displayed for navigation. The video system 48 may include a monitor and related electronics to display video, such as from content associated with a DVD, a motion picture expert group (MPEG) type file, a Quicktime format file, a Cinepak format file, Indeo format file, and an AVI file.

In one exemplary embodiment, the user interface 50 provides controls to rip/copy an entire CD (compressed or normal), DVD, or other portable storage medium to the hard drive 34. In another exemplary embodiment, the user interface 50 provides controls to rip/copy specific tracks or files contained on the CD, DVD, or other portable storage medium. For example, during playback of the portable storage medium, the user may select a currently played track or file for ripping/copying to the hard drive 34. Additionally, the user interface 50 may provide a control to delete the currently played track or file from the hard drive 34. The user interface 50 displays the specific tracks or files that have been ripped/copied to the hard drive 34 from the portable storage medium. In this embodiment, the user has flexibility to selectively store and prune content recorded to the hard drive 34.

The rip or copy speed of multimedia files to the hard drive 34 may be limited due to shock and vibration while the vehicle 12 (FIG. 1) is in motion. In one exemplary embodiment, the hard drive 34 has a variable rip speed that dynamically adjusts based on vehicle movement. By coupling the microprocessor 36 to the various vehicle systems/subsystems, such as a body control module or throttle control module, the microprocessor 36 may increase or decrease rip speed based on status information communicated from such vehicle systems/subsystems. For example, the rip speed of the hard drive may be increase while the vehicle is not moving to maximize transfer time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic vehicle storage system comprising:
   a vehicle electrical infrastructure;

a vehicle communications network coupled to said vehicle electrical infrastructure;

a controller coupled to said vehicle electrical infrastructure via said vehicle communications network, said controller configured to communicate with said vehicle electrical infrastructure; and a data storage device coupled to said controller and configured to store multimedia files, said data storage device comprising an embedded database containing a list of multimedia file content, said controller further configured to:

access said embedded database; and associate a recognized multimedia file with a multimedia file content from said list of multimedia file content.

2. An electronic vehicle storage system according to claim 1, wherein said data storage device is a hard disk drive having a memory; and wherein said multimedia files are compressed multimedia files.

3. An electronic vehicle storage system according to claim 2, wherein said hard disk drive is configured to write said recognized multimedia file to said memory at a dynamic rate based on a vehicle movement.

4. An electronic vehicle storage system according to claim 1 further comprising a telematics transceiver coupled to said controller, said telematics transceiver configured to retrieve a multimedia file content corresponding to a non-recognized multimedia file.

5. An electronic vehicle storage system according to claim 1 further comprising a satellite receiver coupled to said data storage device, said satellite receiver configured to receive an updated list of multimedia file content, said data storage device configured to store said updated list of multimedia file content.

6. An electronic vehicle storage system according to claim 1 further comprising a media playback device coupled to said data storage device, said media playback device configured to transfer multimedia files to said data storage device, said media playback device selected from a compact disc player, a magnetic tape player, an MP3 player, and a mini-disc player.

7. An electronic vehicle storage system according to claim 6, wherein said transferred audio files are compressed and encrypted; and wherein said controller is further configured to decrypt said audio files using a vehicle identification number (VIN) corresponding to a vehicle.

8. An electronic vehicle storage system according to claim 1 further comprising a portable storage media coupled to said data storage device, said portable storage media containing audio files encrypted with a VIN corresponding to a vehicle; wherein said controller is further configured to decrypt said audio files using said VIN.

9. An electronic vehicle storage system according to claim 1 further comprising a wireless transceiver coupled to said data storage device, said wireless transceiver configured to:

transfer multimedia content stored in said data storage device to a personal computer; and transfer multimedia content stored in said personal computer to said data storage device.

10. An electronic vehicle storage system according to claim 1, wherein said vehicle electrical infrastructure comprises at least one component selected from an engine management system, a transmission management system, and a body control module.

11. An electronic vehicle storage system according to claim 10, wherein said controller is further configured to retrieve diagnostic and status information from said vehicle electrical infrastructure, and wherein said data storage device is configured to store said diagnostic and status information.

12. An infotainment system for a motor vehicle, said infotainment system comprising:

at least one vehicle electrical subsystem;

a controller coupled to said at least one vehicle electrical subsystem;

a hard drive coupled to said controller, said hard drive configured to store multimedia files, said hard drive comprising an embedded database containing a plurality of content lists; and a playback device coupled to said controller, said playback device configured to playback multimedia files stored on a portable storage medium, said controller further configured to:

access said embedded database;

associate said multimedia files stored on said portable storage medium with a content list from said plurality of content lists; and transfer at least a portion of said multimedia file associated with said portable storage medium to said hard drive.

13. An infotainment system according to claim 12, wherein said multimedia file is an audio file.

14. An infotainment system according to claim 12, wherein said controller is configured to transfer said at least a portion of said audio file to said hard drive during playback of said audio file by said playback device.

15. An infotainment system according to claim 12, wherein said controller is configured to delete a current playback track of said at least a portion of said audio file from said hard drive during playback of said audio file by said playback device.

16. An infotainment system according to claim 12 further comprising a wireless transceiver coupled to said controller, said wireless transceiver configured to communicate with a personal computer, said personal computer having a memory; and wherein said controller is configured to wirelessly transfer said multimedia files stored on said hard drive to said personal computer.

17. An infotainment system according to claim 16, wherein said wireless transceiver is further configured to communicate with a multimedia data storage device, said multimedia data storage device configured to store multimedia content files;

wherein said controller is configured to wirelessly transfer said multimedia content files to said hard drive; and wherein said hard drive is configured to store said multimedia content files.

18. An infotainment system according to claim 12, wherein said content list associated with said portable storage medium comprises at least one of music genre types, musical performers, and albums; wherein said controller is configured to monitor playback of said audio files and determine listening habits based on content associated with said playback of said audio files.

19. An infotainment system according to claim 18, wherein said controller is configured to generate a playlist of audio files stored on said hard drive based on said determined listening habits.

20. An infotainment system according to claim 12, wherein said at least one vehicle electrical subsystem is selected from an engine management system, a transmission management system, a body control module, and an antilock brake system.

* * * * *